Dec. 9, 1952             H. F. HOBBS            2,620,814
CENTRIFUGALLY ACTUATED FLUID CONTROL VALVE
Filed Feb. 19, 1948
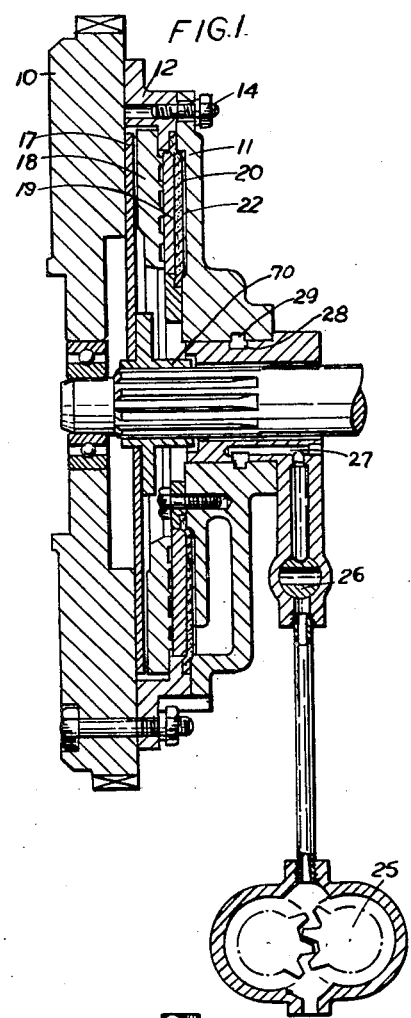
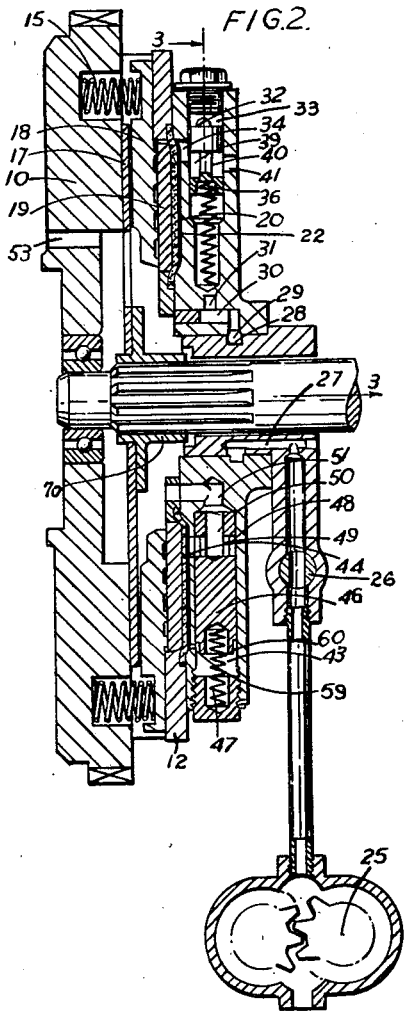
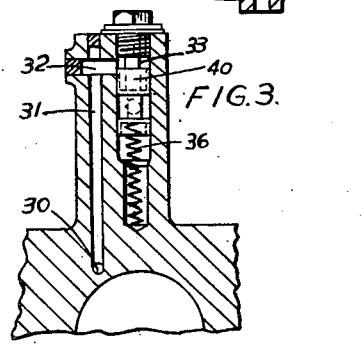
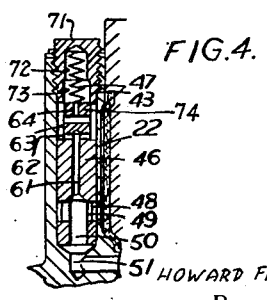
Inventor
HOWARD FREDERICK HOBBS
By
Oberlin & Limbach
Attorney

Patented Dec. 9, 1952

2,620,814

UNITED STATES PATENT OFFICE 2,620,814

CENTRIFUGALLY ACTUATED FLUID CONTROL VALVE

Howard Frederick Hobbs, Leamington Spa, England, assignor to Hobbs Transmission Limited, Leamington Spa, England, a British company Application February 19, 1948, Serial No. 9,544
In Great Britain March 4, 1947

5 Claims. (Cl. 137—56)

This invention relates to hydraulically operated friction clutches of the kind having a rotary housing carried by an input member having a space for liquid under pressure, friction elements, and a flexible diaphragm or one or more pistons by means of which the pressure of oil or other liquid in said space is utilized for urging the friction elements together.

It has been proposed to employ a centrifugally operated valve in clutches of this type so that below some predetermined speed of the input member the valve will open the actuating oil pressure to exhaust, thus permitting the clutch to become disengaged, and similarly on exceeding some given speed the clutch becomes engaged thereby relieving the operator of the need for manual manipulation.

In clutches of this kind there is considerable liability to hunting, particularly if the centrifugally operated valve is remote from the oil space. It has been proposed to lead the oil pressure to the outer end of a centrifugally operated piston exhausting valve so that there will be a given pressure in the clutch depending on the mass of the valve at any given speed during the take up or engaging period. Such an arrangement also provides a tendency to hunt, particularly if the pressure connection is remote from the oil space.

Various methods have been proposed whereby a centrifugally operated valve is arranged to have a snap-over action so that it will not again move inwards until speed is reduced. This is a desirable feature and tends to prevent hunting, but it does not give the desired slow closing action.

Greatly improved operation is obtained by damping the valve so that it always tends to close slowly thus providing a smooth and gradual increase in operating pressure. The same means can also be employed to cause the valve to remain shut until the speed is reduced to some predetermined minimum value.

It is desirable to operate certain types of oil actuated clutch in a wet condition, i. e., with the friction faces lubricated. It is recognised that the smoothest operation can be obtained by applying a gradually increased pressure to the clutch, which pressure finally exceeds that required to transmit the torque developed by the engine. This avoids snatch at final take up owing to the fact that at this phase of operation the engaging load exceeds that required to transmit torque and remains applied even though speed be reduced.

According to the invention the rotary housing carries a cylinder containing a centrifugally operated spring urged piston valve which over one part of its travel opens an exhaust port in the cylinder, the outer end of said cylinder being open to the space for liquid pressure or to another source of liquid when the piston is in some positions, but closed to said space or source when the piston is in other positions excepting through a working clearance provided between the piston and cylinder, whereby liquid is trapped at the outer end of the piston which can consequently only move outwards as the trapped liquid leaks away through said clearance.

The trapped oil may leak back to the oil space or duct connected thereto, in which case liquid pressure at the outer end of the piston will not fall below that within the space or duct, or alternatively the trapped oil may leak away to a space not under the actuating liquid pressure.

A spring may be arranged to act on the outer end of the valve so as to urge it inwards whereby at some predetermined low speed the spring will overcome the centrifugal force on the valve and also the suction at the outer end of the valve, thus causing the valve to open the liquid space to exhaust. In this position the space at the outer end of the valve will open to the space or duct and oil will enter the cylinder. With increased speed the valve will tend to move outwards since the centrifugal force will be greater than the force from the spring and will gradually close the exhaust as the oil trapped at the outer end leaks away.

The invention will now be described by way of example with reference to the accompanying drawings in which:

Figure 1 is a longitudinal sectional view through an apparatus made in accordance with the invention;

Figure 2 is another longitudinal sectional view thereof showing the centrifugally operated valve, Figure 3 is a section on the line 3—3 of Fig. 2, showing the arrangement of the ducts and valve; and Figure 4 is a fragmentary section showing an alternative construction of the centrifugally operated spring pressed piston valve.

An input member or flywheel 10 carries a ring 12 and a back plate 11, the back plate being bolted to the ring 12 by means of bolts 14. The parts 10, 12, 14 constitute a rotary housing which contains the liquid pressure space 22. A clutch spinner plate 17 is attached to the output shaft by means of a splined hub 70 and is engageable with the flywheel 10 and a pressure plate 18 that is carried by the rotary housing. An insulator plate 19 separates the pressure plate from a synthetic rubber faced diaphragm 20 which forms one wall of the liquid actuating space 22. Springs 15 serve to hold the pressure plate disengaged. A pump 25 provides liquid under pressure for actuating the clutch and a valve 26 can be positioned so as to direct the liquid pressure to a duct 27. The liquid pressure reaches a valve cylinder through the duct 27, mating grooves 28, 29, ducts 30, 31 and 32. A centrifugally operating piston valve 40 is located in the valve cylinder and is held outwards by a spring 36 against a stop 33, in which position the space 22 is open to an exhaust port 41, through a duct 34. If the valve 26 is positioned to allow the liquid pressure to reach the outer end of the valve 40 the valve will move inwards thus closing the exhaust 41 and opening the duct 34 to the duct 32, whereby the liquid pressure reaches the liquid space 22. The mass of the valve 40 is such that centrifugal force thereto will balance the centrifugal head in the ducts 30, 31, 32, so that when the valve 26 is shut and the exhaust is opened the valve 40 will move outwards under the action of the spring 36. This valve 40 serves to exhaust the liquid space to disengage the clutch when the valve 26 is closed. The centrifugally operated spring pressed piston valve 46 operates in a cylinder 43 formed in the rotary back plate 11 of the clutch. The valve is urged inwards by a spring 47 and in this position opens the liquid space 22 to exhaust through duct 44, groove 48, ducts 49, 50, 51. When in the position shown the small duct 59 leading from the liquid space opens to the cylinder 43, the piston being reduced in diameter at 60 so as to uncover the duct. In this position the liquid entering the space through duct 34 is exhausted through duct 51, the space being maintained filled but pressure developed in the space being insufficient to overcome the force from the springs 15. If speed is increased above some predetermined amount the valve 46 will move outwards against the spring 47 and will thus close the duct 59. On further increase in speed the piston 46 will move outwards and so close duct 44. The rate of movement will, however, be restricted owing to the liquid trapped in the cylinder 43 which must leak through the clearance between the piston 46 and the cylinder wall. The duct 44 will close gradually and pressure will be gradually built up in the space 22. Should speed slacken during closing of the valve 46 it will not tend to open immediately owing to the fact that the cylinder 43 is closed and the liquid cannot readily re-enter the cylinder and a vacuum will be created should the piston valve 46 begin to move inwards. A substantial reduction in speed will therefore be required before the spring 47 can overcome both the suction and the centrifugal force acting on the valve 46, to move it to the open position. In a clutch of this kind considerable centrifugal head is developed within the space, so that on speeding up the flywheel 10 pressure may be applied to the clutch plate 17 even before the duct 44 is sufficiently closed to cause any substantial restriction to the flow of liquid from the pump 25. Instead of filling the space in the cylinder 43 from the duct 59 this duct may be omitted and the cylinder and piston constructed as shown in Figure 4, in which the piston 46 has a reduced diameter end 74 adapted to enter a space 43 which is filled from the duct 50 which is connected to the space 63 around the end 74 by ducts 61, 62, oil entering space 43 through a cross-duct 64 which is shut by engagement with the wall of the space 43 when the piston moves outwards. The cylinder cap 71 may carry a sleeve which extends to form a cylinder having two diameters 72, 73, the latter forming the space 43 in alignment with the piston. The oil trapped at the outer end of the piston leaks away to a space 51 not under pressure.

If the arrangement is such that the trapped oil leaks back to the oil space or supply duct which are under the actuating pressure, the trapped oil will be maintained at a pressure at least as great as the actuating pressure, and hence the engagement of the clutch will be dependent on speed, since the force of the valve must be greater than that carried by the actuating pressure on its outer end before it will move outwards and close the exhaust. Such an arrangement provides a gradual build up in engaging pressure up to and beyond the speed at which the clutch fully engages.

If the valve is arranged so that the trapped oil leaks away to a space not under the actuating liquid pressure engagement of the clutch is more dependent on a time factor. As soon as the speed is sufficiently increased the centrifugal force on the valve overcomes the spring which tends to hold it inwards and the valve will begin to shut the exhaust and will move outwards until the exhaust is fully closed even though the speed is not further increased. This tends to provide an increase in pressure up to a certain value and then a more rapid build up to the maximum provided by the liquid supply pump. Such a take up characteristic is very suitable for certain types of lubricated friction clutches.

Since the closing of the exhaust is dependent on time rather than on speed a quickly opened engine throttle will cause momentary increase in speed and a decrease in speed will follow which causes additional torque to be applied from the rotating parts of the engine during the final phase of take up. This is particularly valuable for a vehicle having an internal combustion engine. It should be understood that somewhat the same effect is obtained when the trapped oil leaks back to a space under pressure, but to a lesser degree.

What I claim is:

1. In an automatically operating control device for apparatus of the class described which has a housing including a space for pressure-liquid and being mounted for rotation about an axis and having means for effecting rotation of said housing, a cylinder carried by said housing having one end further from the axis of rotation than the other end, a piston valve in said cylinder movable outwardly by centrifugal force of the housing rotation, a spring at the outer end of said valve for return but allowing such centrifugal outward movement above a predetermined speed, means for supplying liquid to said cylinder from said space including an inlet port between said space and the cylinder, an exhaust port in the cylinder open over one part of travel of said valve but closed when the valve is moved to its outer position by centrifugal force, said cylinder having a liquid trapping portion in that part of the cylinder that is furthest from the axis of rotation in which trapping portion liquid is trapped while the exhaust is still open, said piston providing a leakage outlet in communication with said trapping portion of said cylinder for retarded escape of trapped liquid during closing of said exhaust port, and an inlet port between said space and said portion of the cylinder for entry of liquid from said space to said portion of the cylinder which inlet port is closed as the piston valve moves to close said exhaust port, said cylinder having no inlet opening other than from said space.

2. Apparatus as claimed in claim 1 wherein a liquid duct communicates with the space for pressure-liquid, and the space at the outer end of said piston is filled therefrom by liquid under the liquid pressure.

3. Apparatus as claimed in claim 2 wherein the leakage outlet for the liquid trapped at the outer end of said piston leads to a space filled with liquid at the actuating pressure.

4. Apparatus as claimed in claim 2 wherein the leakage outlet for the liquid trapped at the outer end of said piston leads to an exhaust space not under the actuating pressure.

5. Apparatus as claimed in claim 1 in which the centrifugally operating piston valve is arranged closely adjacent to the space for pressure-fluid and the liquid ducts connecting said space and valve are short and direct.

HOWARD FREDERICK HOBBS.

REFERENCES CITED

The following references are of record in the file of this patent:

UNITED STATES PATENTS

| Number | Name | Date |
|---|---|---|
| 2,163,203 | Kegresse | June 20, 1939 |
| 2,275,204 | Smirl | Mar. 3, 1942 |
| 2,325,814 | Tyler | Aug. 3, 1943 |
| 2,328,091 | Mitt et al. | Aug. 31, 1943 |
| 2,328,092 | Mitt et al. | Aug. 31, 1943 |
| 2,440,589 | Kegresse | Apr. 27, 1948 |

FOREIGN PATENTS

| Number | Country | Date |
|---|---|---|
| 643,678 | Germany | Apr. 14, 1937 |